United States Patent [19]

Fagerhaug et al.

[11] 4,028,189
[45] June 7, 1977

[54] PROCEDURE AND DEVICE FOR RAPID COMPOSTING OF ORGANIC WASTE

[75] Inventors: Bjørn Fagerhaug, Skarer; Karl Øberg, Nesoya, both of Norway

[73] Assignee: Kvaerner Brug A/S, Oslo, Norway

[22] Filed: Aug. 26, 1975

[21] Appl. No.: 608,017

[30] Foreign Application Priority Data

Jan. 23, 1975   Norway .............................. 750211

[52] U.S. Cl. ................................ 195/109; 195/142
[51] Int. Cl.² .......................................... C12B 1/14
[58] Field of Search .......... 195/109, 142, 143, 144, 195/127

[56] References Cited

UNITED STATES PATENTS

| | | | |
|---|---|---|---|
| 2,098,962 | 11/1937 | Hellbach | 195/109 |
| 3,676,074 | 5/1970 | Shibayama et al. | 195/142 |

FOREIGN PATENTS OR APPLICATIONS

| | | | |
|---|---|---|---|
| 523,694 | 2/1956 | Belgium | 195/109 |
| 490,426 | 8/1938 | United Kingdom | 195/109 |

*Primary Examiner*—Alvin E. Tanenholtz
*Assistant Examiner*—C. A. Fan
*Attorney, Agent, or Firm*—Young & Thompson

[57] ABSTRACT

Organic waste is composted whereby it is brought into repeated sliding layer contact with an air current. This contact is provided for in an inclined, rotating cylinder.

8 Claims, 2 Drawing Figures

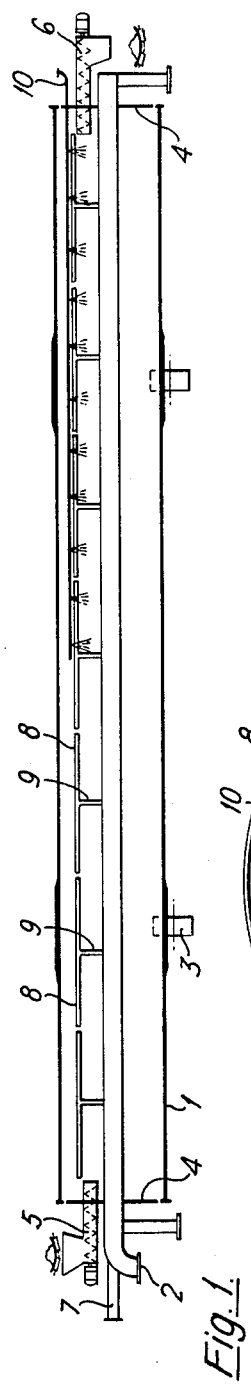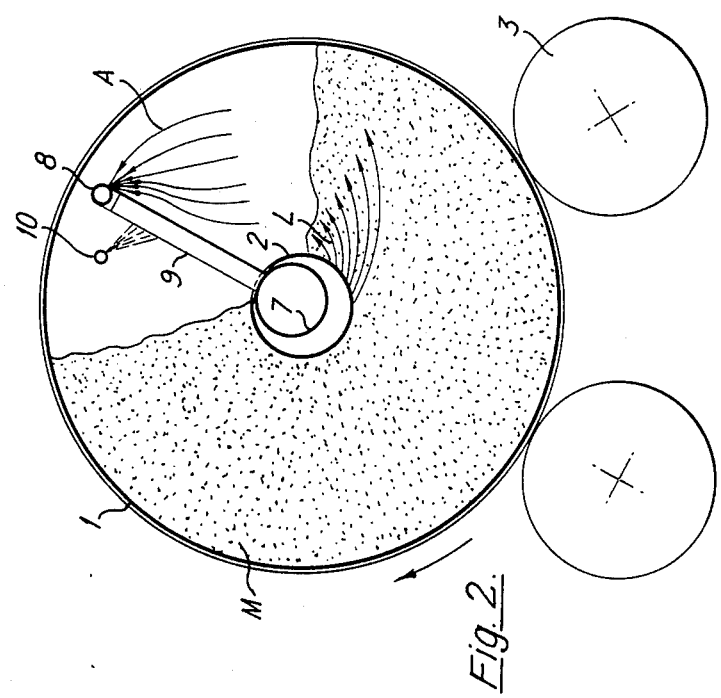

PROCEDURE AND DEVICE FOR RAPID COMPOSTING OF ORGANIC WASTE

The invention relates to a procedure and a device for rapid composting or organic waste substances such as sewage, household garbage, slaughteroffal and plant refuse, bark etc.

The decaying process which takes place in nature, where organic waste matter of many kinds is broken down to humus as a consequence of the interaction of different micor-organisms, can be hastened considerably by giving these micro-organisms optimal possibilities of thriving. The most important factors in this connection are oxygen, water, temperature and nitrogen, and other elements as well whose significance is unclear.

With varying success a number of different methods have been marketed for breaking down household garbage, sewage, bark etc.

The invention aims at providing a procedure which offers extremely good control possibilities with regard to factors such as oxygen, temperature, water and to a degree nitrogen. This is achieved by subjecting the mass which is to be composted to repeated sliding layer contact by means of a stream of air. In this way the gas which arises during the composting process is displaced, and the empty spaces in the mass are filled with fresh air which maintains the process until new air scavenging takes place.

The interim between each air scavenging of a given particle can be regulated as required. The temperature can also be regulated to advantage by regulating the amounts of air which are blown in and sucked out. The humidity can be regulated as required by adding water to the mass.

According to the invention the mass can, to advantage be led into and through a rotating cylinder, in such a way that a sliding on the surface of the mass comes about, in that air is led into the cylinder in such a way that the mass must pass the current of air each time the cylinder rotates. The use of a rotating cylinder through which the mass is led makes possible a sliding on the surface of the mass. The mass is thereby brought to pass a current of air for every rotation of the cylinder. The time interval between each air scavenging of a given particle can thereby be regulated by means of the cylinder's speed of rotation.

The invention relates also to a device for carrying out the procedure according to the invention, and the device comprises mainly a horizontal or inclined, rotating cylinder with feeding and discharge attachments in each end of the cylinder, an apparatus for supplying air to the inside of the cylinder along the length of the cylinder, and a suction device placed in the upper part of the cylinder, as well as a device for adding water to the mass in the cylinder.

The mass to be composted is fed continuously in through the one end of the cylinder and is taken out at the opposite end. The feeding and suction apparatuses can vary in form according to the apparatus's capacity and the type of mass to be treated. If necessary, the cylinder can be equipped with carrier devices attached to the wall of the cylinder to ensure that the mass rotates with the cylinder. The filling of the cylinder shall be such that a sliding which will take place on the surface of the mass, will take place in such a way that the total mass has to pass the current of air once every time that the cylinder revolves.

Preferably the device for supplying air is constructed as a centrally fitted pipe running in the longitudinal direction of the cylinder. It is advantageously perforated for injecting air out into the mass. By placing the pipe in a central position, it is attained that when the cylinder is correctly filled, the sliding which takes place on the surface of the mass, will occur on the upper side of the central pipe, in such a way that the entire mass has to pass the current of air between the central pipe and the suction once every time the cylinder revolves.

In this way it is attained that the exhaust gas which is formed while the mass is under the surface, is displaced by the current of fresh air and disappears through suction, and that the empty spaces in the mass are filled with fresh air before the next rotation. The number of revolutions per minute of the drum must be sufficiently high so that the concentration of oxygen in the mass is not too small before the next blowingthrough takes place.

Experiments indicate that the new airing principle allows smaller particle size and a mixing in of more sludge than that which has been customary in other known processes. Both elements contribute to increase the turnover conversion. A small particle volume hastens the decaying process and the sewage sludge contributes to the obtainment of a more correct proportion between carbon and nitrogen.

The heat which is developed by the micro-biological activity in the mass, will bring the temperature in the cylinder up so high that destruction of the microbes will occur, or at best, that a reduction of the turnover conversion will take place. To prevent this, the air current between the central pipe and the suction is increased so that the mass is cooled down to the desired temperature. This can vary somewhat in the longitudinal direction of the cylinder, according to which microbes are to be given optimal conditions, and according to whether the aim is maximum rate of decomposition in that particular section of the cylinder, or a destruction of disease-producing and undesirable substances which may have come into the cylinder with the sewage or garbage.

The intense heat development in the drum, as well as the vigorous airing, will have a drying-out effect on the mass to be composted, with the result that the moisture sinks to below the level necessary for an effective composting. To compensate for this, a spraying system for water can be arranged within the cylinder, so that water can be added in that part of the cylinder where it is necessary. This spray system can also be used for cooling within the moistened area to an acceptable degree with regard to the micro-biological activity.

The invention will be described in more detail with respect to the drawings, where FIG. 1 shows a rough longitudinal section through an installation for composting according to the invention, and FIG. 2 shows a rough cross-section, on a larger scale.

The installation mainly consists of a cylinder 1, rotatably mounted on supporting rollers 3, equipped with stationary end plates 4. The cylinder can be rotated by means of a driving mechanism (not shown), in the rotation direction indicated by the arrow in FIG. 2.

A pipe 2 is brought into the cylinder 1 through the end plates 4, and said pipe 2 serves to introduce air into the cylinder. The pipe 2 is perforated so that air can stream out into the mass as indicated in FIG. 2, by arrows L. The desired filling of the mass in the cylinder during operation is indicated in FIG. 2 by shading and marked with M.

In the central pipe 2 an exhaust pipe 7 is placed. From the exhaust pipe 7 extend evenly spaced radial pipes 9, which communicate through openings arranged for this purpose in the wall in the central pipe 2. Each of these radial pipes 9 connects with pipe 8 running in the cylinder's longitudinal direction. These pipes are equipped with openings so that the exhaust gas can be sucked out through pipes 8, the radial pipes 9 and the common exhaust pipe 7. This sucking out of gas is indicated by the arrows A in the section in FIG. 2.

In FIG. 1 is arranged in the other half of the cylinder a water pipe 10 for spraying in water for wetting the mass as desired. The water pipe 10 is equipped with openings or nozzles for spraying out the water. This watering system can also be used for cooling within the moistened area as acceptable with regard to the microbiological activity.

The mass to be composted is led into the cylinder by means of the feed screw 5, and is taken out by means of discharge screw 6 at the other end of the cylinder. The filling of cylinder 1 is determined in such a way that the situation shown in the section in FIG. 2 is approximately obtained. During the rotation of the cylinder a sliding takes place on the surface of the mass, and the complete mass must thus pass the current of air which is led through the central pipe 2. The exhaust which arises during composting is displaced, and the empty spaces in the mass are filled with fresh air which maintains the process until new air scavenging takes place. The time interval between each air scavenging of a given particle can be regulated by means of the cylinder's speed of rotation. The temperature is regulated by the amount of air which is blown in and sucked out. The moisture is regulated by adding water to the mass. Instead of as shown, the suction pipe can be led directly out through the end plates, so that the exhaust pipes 7 and 9 can be omitted.

I claim:

1. A procedure for rapid composting of organic waste substances, comprising rotating a cylinder about its axis with its axis substantially horizontal, introducing waste substance into one end of said cylinder and withdrawing waste substance from the other end of said cylinder thereby to establish in said cylinder a mass of said waste substance that has an exposed upper surface within the cylinder whereby upon rotation of the cylinder, portions of the waste substance slide on said surface, introducing air into said mass from within said mass from locations distributed along the length of said mass in said cylinder and below said surface, and withdrawing gas from within said cylinder above said surface from locations distributed along the length of said cylinder.

2. A procedure as claimed in claim 1, in which said air is introduced into said mass from a multiplicity of points spaced lengthwise along said cylinder, and said gas is withdrawn at a multiplicity of points spaced apart lengthwise along said cylinder.

3. A procedure according to claim 1, and introducing said waste substance into one end of said cylinder and withdrawing said waste substance from the other end of said cylinder, and spraying water on said waste substance only adjacent said other end of said cylinder.

4. A device for rapid composting of organic waste substances, comprising a hollow cylinder, means for rotating said cylinder about a substantially horizontal axis, means for introducing waste substance into one end of said cylinder, means for withdrawing waste substance from the other end of said cylinder, means for introducing air into a mass of waste substance in said cylinder from a multiplicity of locations distributed along a central portion of the cylinder, and means for withdrawing gas from a multiplicity of locations distributed lengthwise along an upper portion of said cylinder above said locations of air introduction.

5. A device according to claim 4, and means for spraying water on said waste substance only adjacent said other end of said cylinder.

6. A device according to claim 4, said gas withdrawal means comprising at least one pipe extending lengthwise along an upper portion of the interior of said cylinder having a multiplicity of openings therethrough for the inlet of said gas into said pipe.

7. A device according to claim 6, said at least one pipe extending substantially full length of said cylinder.

8. A device according to claim 7, said air introducing means comprising a central pipe that extends axially of said cylinder and has a multiplicity of openings therethrough spaced apart along the length thereof for the outward passage of air into said mass.

* * * * *